United States Patent Office 3,763,247
Patented Oct. 2, 1973

3,763,247
PROCESS OF PRODUCING BUTANALS BY OXO SYNTHESIS, AND ITS APPLICATION TO THE MANUFACTURE OF ETHYLHEXANOL
Hans Lemke, Asnieres, and René Duval, Bois-Colombes, France, assignors to Societe Anonyme: Ugine Kuhlmann, Paris, France
Filed Feb. 14, 1969, Ser. No. 799,279
Claims priority, application France, Feb. 15, 1968, 140,024
Int. Cl. C07c 29/16
U.S. Cl. 260—638 HF      3 Claims

ABSTRACT OF THE DISCLOSURE

The invention relates to the hydroformylation of propylene for production of butanals and subsequent manufacture of ethylhexanol, with a cobalt-carbonyl catalyst, which in the recuperation, regeneration, and recycling cycle of the catalyst, makes use of a neutral solvent which can be produced from byproducts of the synthesis which by themselves, and used as such would not give the same result from the point of view of selectivity and yield.

---

The present invention relates to the hydroformylation of propylene for the purpose of producing butanals, and also to the subsequent manufacture of ethylhexanol from the n-butanol formed during this synthesis, using one and the same solvent for all the operations.

It is known that the synthesis of butanals from propylene consists in subjecting propylene to the action of a gaseous mixture of carbon monoxide and hydrogen in the presence of a catalyst composed of cobalt-carbonyls. There is thus obtained a mixture of n-butanal and iso-butanal, accompanied by small amounts of butyl formiates, butanals, and high boiling point condensation products. In U.S. Pat. No. 3,188,351 there is described a process permitting elimination in a particularly advantageous manner of the cobalt-carbonyl catalyst from the reaction product and recycling it to the hydroformylation phase. This process consists fundamentally in treating the hydroformylation product in the presence of the synthesis gas with an aqueous solution of an alkali or alkaline earth metal compound, in order to convert the cobalt-carbonyls contained in the organic product into a cobalt-tetracarbonyl hydride salt which is soluble in water. The elimination of the cobalt from the organic product is based on the solubility in water of cobalt-tetracarbonyl hydride salts and on their insolubility in the organic product. It is thus possible to extract the cobalt-tetracarbonyl hydride from the reaction product. The cobalt-tetracarbonyl hydride can then be reintroduced into the hydroformylation reactor by treating the aqueous solution containing its alkali or alkaline earth metal salt with an acid solution and entraining the cobalt-tetracarbonyl hydride thus liberated with the aid of a current of gas or of an organic liquid. Nevertheless, in the case of the synthesis of butanals by hydroformylation of propylene, it has been found that this elimination of cobalt is not as easy as in the case of oxo products having a longer carbon chain, because the alkali or alkaline earth metal salts of cobalt-tetracarbonyl hydride are fairly soluble in the butanals. It has been realised that, in order to obtain a more favourable distribution of the cobalt in the two phases, it is necessary to make use of an organic solvent which reduces the solubility of the cobalt-tetracarbonyl hydride salts in the organic phase. The usefulness of the presence of a solvent has also been recognised for a long time for the hydroformylation of propylene, because the dilution of the olefin and of the reaction products formed, by means of a suitable solvent, permits better control of the oxo reaction both from the point of view of elimination of heat and from the point of view of selectivity. In the known processes the solvents are constituted either by products extraneous to the synthesis, such as aliphatic, cyclic, or aromatic hydrocarbon, ethers, glycols, ketones, or by products originating from the synthesis, such as aldehydes, alcohols, acetals, formiates, high boiling point products. Whereas neutral solvents, such as toluene, the xylenes, ethylbenzene, diethyl ether, diphenyl oxide, make it possible to effect the hydroformylation of propylene with a high yield of monomer products, solvents carrying reactive functions, such as the butanals, butanols, and heavy synthesis products, have the disadvantage of giving rise to secondary reactions and of reducing the selectivity of the synthesis. The choice of a suitable solvent, both from the point of view of its physical and chemical properties and from the point of view of economy, is therefore of primary importance in the case of the hydroformylation of propylene.

In addition, it is likewise well known that ethylhexanol can be produced by the following successive reactions.

(1) Hydroformylation of propylene:

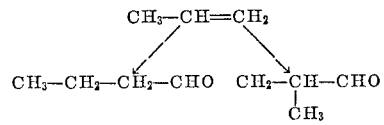

(2) Aldolisation of n-butanal followed by crotonisation of the butyraldol formed:

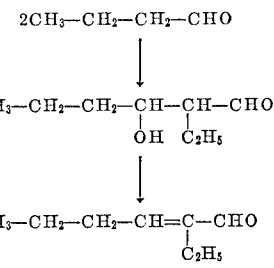

(3) Hydrogenation of ethyl-2 hexene-2-al-1:

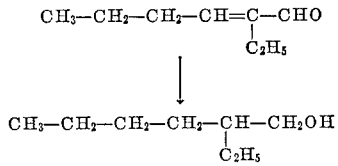

In cases where reactions (2) and (3) are effected on n-butanal isolated in the pure state, the oxo synthesis serves only to supply raw material for the production of ethylhexanol, and there is no connection between the hydroformylation (reaction (1)) and the following operations (reactions (2) and (3)).

From the technological and economic point of view, it is more favourable to combine at least the reactions (1) and (2) by effecting the aldolisation-crotonisation direct on the oxo product, without intermediate isolation of n-butanal. It is then possible to effect the aldolisation already in the oxo reactor, by effecting the hydroformylation in the presence of a "co-catalyst" or "modifier." These "modifiers" are constituted by certain metallic compounds, particularly zinc and magnesium, potassium, and certain amines.

In these processes, in which the hydroformylation is carried out in the presence of co-catalysts, part of the n-butanal is converted during the oxo synthesis into ethyl-2 hexenal and, under certain conditions, into ethyl-2 hexanol. Although this technique effects the hydroformylation and the aldolisation in a single operation and thus combines reactions (1) and (2), it has the essential disadvantage of lacking selectivity because, due to the presence of isobutanal, mixed aldolisation occurs between the n-butanal and the isobutanal, with the formation of ethyl-2-methyl-4 pentenal and heavy products. Another disadvantage of the process effecting the hydroformylation and the aldolisation-crotonisation in a single phase is that only partial conversion of the n-butanal into ethyl-2 hexenal is achieved. After catalytic hydrogenation, the synthesis product contains consequently, in addition to ethyl-2 hexanol, considerable amounts of n-butanol, isobutanol, and also undesirable products, such as ethyl-2 methyl-4 pentanol and compounds having a molecular weight higher than that of the $C_8$ alcohols.

When it is desired to convert propylene into ethyl-2 hexanol with maximum yield, and thus to achieve optimum utilisation of the propylene, the process effecting simultaneously the hydroformylation and the aldolisation-crotonisation is scarcely likely to comply with this requirement. Even recycling of the n-butanal not aldolised to the hydroformylation reactor is not sufficient to obtain optimum yields of ethyl-2 hexanol, because the prolonged residence of the n-butanal in the reactor also promotes the secondary reactions.

The present invention has primarily as object a process of hydroformylation of propylene with a cobalt-carbonyl catalyst, which in the recuperation, regeneration, and recycling cycle of the catalyst, makes use of a neutral solvent which can be produced from by-products of the synthesis which by themselves, and used as such, would not give the same result from the point of view of selectivity and yield.

The invention likewise has an object a process for the production of ethyl-2 hexanol from the n-butanal obtained by this hydroformylation of propylene, which avoids the disadvantages of the processes referred to above by combining the phases of hydroformylation and aldolisation-crotonisation, and which makes it possible to carry out all the reactions in the presence of the same neutral solvent, this process having in addition the advantage of leading to the production, without subsidiary operations, of an additional amount of by-products directly suitable for the manufacture of the solvent required for the initial hydroformylation reaction.

The process according to the invention consists fundamentally in utilising as solvent, in the hydroformylation of propylene in the presence of cobalt-carbonyls, butyl ethers obtained at least partly by catalytic dehydration of butanols formed in the course of the hydroformylation reaction.

In the performance of the invention, after having used at the outset the necessary amount of butyl ethers, the additional solvent required for making good the losses which occur in the course of the operations is obtained by separating by distillation the butanols resulting from the oxo reaction and subjecting them to catalytic dehydration.

This dehydration may be carried out by heating the butanols at a temperature of the order of 150 to 300° C. in the presence of dehydration catalysts, such as sulphates (for example partially dehydrated potassium alum, iron sulphate, sodium or potassium bisulphate), such as oxides (for example alumina, thorin, zirconia, silica), such as acids (for example sulphuric acid, phosphoric acid).

The amount of butanols available for the preparation of butyl ethers following the oxo reaction may advantageously be increased by converting into butanols the butyl formiates resulting from said oxo reaction, by saponification of said formiates, for example by treatment of the latter with the aid of an alkaline solution.

In practice, the butanals are isolated from the oxo reaction products by distillation, and then the residue is treated with an alkaline solution in order to convert the formiates into butanols, after which there is isolated by distillation an azeotropic fraction comprising butanols and butyl ethers, which is subjected to the dehydration treatment. Any excess of butyl ethers obtained, over what is necessary to make good losses, may be used as solvent in a new oxo synthesis or for any other purposes.

According to a particularly advantageous application of the invention, the mixture of products resulting from the hydroformylation of propylene in the presence of cobalt-carbonyls and butyl ethers is used direct, after decobaltation and separation by distillation of the isobutanal which it contains, for the manufacture of ethyl hexanol by aldolisation-crotonisation of n-butanal, followed by hydrogenation of the ethylhexenal resulting from this last reaction.

In order to carry out this sequence of reactions, the mixture resulting from the oxo reaction, which contains n-butanal, isobutanal, butyl formiates, butanols, solvent butyl ethers, heavy products, and the cobalt-carbonyls, is first freed of the catalyst, then subjected to distillation in order to eliminate practically all the isobutanal; the residual mixture is heated in the presence of an alkaline solution, which effects the aldolisation-crotonisation of n-butanal into ethylhexenal and the conversion of the butyl formiates into butanols; the mixture of ethylhexenal and butyl ethers thus obtained is then treated with hydrogen in the presence of a hydrogenation catalyst, which converts the ethylhexenal into ethylhexanol; the butanols are then separated from the resulting mixture for conversion into butyl ethers by catalytic dehydration in order to make good the losses of solvent for the oxo process, and the ethylhexanol is separated from the butyl ethers, which are recycled to the hydroformylation.

This process provides several advantages. It makes it possible to avoid disadvantages of the previously mentioned processes, the aldolisation-crotonisation of the n-butanal being effected in the absence of isobutanal, which is responsible for the reduction of selectivity and yield, without it being necessary to isolate the n-butanal in the pure state. Although, in contrast to the processes mentioned hereinabove, the aldoslisation-crotonisation is not effected during the hydrofromylation, the two phases are closely connected toegther by the fact that the aldolisation of the n-butanal is effected on the oxo product without elimination of the by-products. This has the effect that all the n-butanal contained in the oxo product after elimination of isobutanal is subjected to the aldolisation, and that the ethyl-2 hexenal formed during the hydroformylation remains present and is added to that resulting from the actual aldolisation-crotonisation, thus increasing the yield. Carrying out the aldolisation in the presence of the by-products of the synthesis, constituted essentially by butanols, butyl formiates, and heavy products, provides in addition the advantage of saponifying the esters, particularly the butyl formiates, because of the alkaline medium in which the aldolisation is carried out. The conversion of the formiates into butanols, which increases the yield of recyclable butyl ethers, is thus carried out without a further operation. The elimination of the butyl formiates during this treatment also provides the great advantage of facilitating the subsequent catalytic hydrogenation of the aldolised-crotonised products, because it is known that formiates are decomposed under conditions of hydrogenation, forming products which obstruct the catalysis. Finally, all the operations of producing ethylhexanol, namely hydroformylation, aldolisation-crotonisation, and hydrogenation, are carried out in the presence of the same solvent, which is neutral during all these operations.

The following non-restrictive examples describe respectively the preparation of isomeric butyl ethers by dehydration of a starting mixture of n-butanol and iso-butanol for the purpose of carrying out the oxo reaction, the hydroformylation of propylene, followed by aldolisation-crotonisation of the n-butanal formed and by the hydrogenation of the ethylhexenal thus obtained, in order to produce ethylhexanol, and finally the preparation of solvent butyl ethers for make-up purposes from the butanols formed in the course of the production of the ethylhexanol.

EXAMPLE 1

Preparation of isomeric butyl ethers by catalytic dehydration of a mixture of n-butanol and isobutanol A dehydration catalyst is prepared by eliminating the water contained in crystallised potassium alum so as to obtain a residual content of about 20%, the mass being formed into grains of from 2 to 5 mm. 900 ml. of this catalyst are placed in a glass tube situated in a furnace heated by an electric resistor. 100 ml. of a mixture composed of 75% n-butanol and 25% isobutanol are injected per hour into a vaporiser heated to 150° C., and the resulting vapours are passed over the catalyst, which is heated to 190° C. At the outlet of the tube the vapours are condensed and the water is eliminated by decantation. By vapour phase chromatographic analysis it is found that the organic product has the following composition:

| | Percent |
|---|---|
| Di-n-butyl ether | 55.8 |
| n-Butyl-isobutyl ether | 25.6 |
| Diisobutyl ether | 0.9 |
| n-Butanol | 3.2 |
| Isobutanol | 2.6 |
| Other products (mainly butenes) | 11.9 |

Thus di-n-butyl ether and n-butyl-isobutyl ether are essentially formed, with practically no diisobutyl ether. In order to isolate the ethers, the product of the reaction is subjected to fractional distillation, which gives a mixture having the following composition:

| | Percent |
|---|---|
| Di-n-butyl ether | 70.4 |
| n-Butyl-isobutyl ether | 29.2 |
| Diisobutyl ether | 0.4 |
| Other products | 0.1 |

EXAMPLE 2

Hydroformylation of propylene and production of ethylhexanol according to the invention 402 g. of the mixture of isomeric butyl ethers prepared in Example 1 and containing 1.45 g. of dissolved dicobalt-octacarbonyl, together with 292 g. of a $C_3$ hydrocarbon fraction containing 93.4% propylene and 6.6% propane are introduced into an autoclave having a capacity of two litres and provided with a magnetic agitator, after careful flushing with nitrogen. After a pressure of 230 bars has been established in the autoclave with a mixture of gases containing 47.8% carbon monoxide, 51.0% hydrogen, and 1.2% inert gases, agitation is commenced and the temperature is rapidly brought to 110° C., at which a drop in pressure is observed. Starting from this moment, the temperature is progressively raised to 145° C. in the course of 90 minutes and the pressure is maintained at 280 bars by adding fresh gas having the same composition as the starting gas.

At the end of the absorption of gas the reaction product is transferred to a second autoclave having a capacity of two litres, heated to 125° C., containing 200 ml. of a 5 g./l. solution of sodium carbonate, and kept at a pressure of 250 bars with the same mixture of gases as that used for the hydroformylation. After treatment for thirty minutes under these conditions, the autoclave is cooled to ambient temperature and the liquid products are withdrawn at atmospheric pressure and collected in a glass balloon flask in which an inert atmosphere is maintained. After separating the decanted aqueous layer containing the greater part of the cobalt used (about 90%), the organic product is washed at ambient temperature with 6 portions of water, each of 75 ml., in order to extract the dissolved cobalt-tetracarbonyl sodium hydride salt. After this treatment, 811 g. of oxo products having a cobalt content below 10 p.p.m. are recovered. The aqueous extract originating from the decobaltation and the washing waters are combined and subjected to rapid topping in a distillation column in order to recover the organic products solubilised in water in the form of an azeotropic fraction. The organic portion of this azeotropic fraction (32 g.) is added to the main quantity of organic oxo reaction product.

The oxo product freed from cobalt and washed (843 g.) is freed from isobutanal in a distillation column. There are collected at the top, after decantation of the water, 92 g. of a fraction containing 97% isobutanal and 3% n-butanol.

The distillation residue, which is practically free from isobutanal, is introduced a little at a time, for the purpose of aldolisation-crotonisation, into a 3-litre ballon flask provided with an effective agitator and containing 920 ml. of 4% sodium hydroxide solution. On completion of the introduction of said residue the reactional mixture is heated to 90° C. for thirty minutes. In addition to the conversion of the n-butanal into ethylhexanal, these conditions permit the saponification of the butyl formiates, with the formation of butanols and sodium formiate. During this treatment the oxo product evolves in the following manner:

| Constituents | Composition of oxo product (percent) | |
|---|---|---|
| | At commencement | After aldolisation-crotonisation |
| n-Butanal | 40.1 | 0.5 |
| Butyl formiates (n+iso) | 2.2 | 0 |
| Butanols (n+iso) | 1.1 | 1.8 |
| Butyl ethers | 53.9 | 57.0 |
| Ethyl-2-hexene-2-al-1 | | 36.1 |
| High boiling point products | 2.7 | 3.1 |
| Water | 0 | 1.5 |

After separation of the aqueous layer, the oxo product originating from the aldolisation-crotonisation is hydrogenated in an autoclave by treating it for two hours in the presence of 10% of a cobalt catalyst at a pressure of 110 bars of hydrogen and at a temperature between 120 and 150° C. After filtration of the catalyst the hydrogenated product is fractionated in a distillation column.

The following fractions are collected:

| Pressures and temperatures | Fractions percent | Composition of fractions |
|---|---|---|
| $E_{760}$:87–135° C | 1.1 | Water. |
| | 6.5 | Butanols, 40%. Butyl ethers, 60%. |
| $E_{150}$:87–94° C | 51.5 | Butyl ethers, 100%. |
| $E_{50}$:75–110° C | 1.2 | Butyl ethers, 50%. ethyl-2 hexanol, 50%. |
| $E_{50}$:110° C | 35.0 | Ethyl-2-hexanol, 99.8%. |
| Residue | 3.8 | Ethyl-2 hexanol, 11%. Products higher than $C_8$ 89%. |
| Losses | 0.9 | |

When the balance of the operation is drawn up, it is found that the yield of ethyl-2 hexanol-1 is 926 g. per 1000 g. of propylene introduced.

EXAMPLE 3

Preparation of make-up solvent from the butanols obtained as secondary products during the different phases of the process described in Example 2

A mixture having the composition of the top fraction isolated on distillation of the hydrogenated product containing ethyl hexanol (see second table, Example 2) is treated by the technique indicated in Example 1. This mixture has the following composition:

| | Percent |
|---|---|
| Isobutanol | 10.7 |
| n-Butanol | 28.0 |
| n-Butyl-isobutyl ether | 59.9 |
| Water | 1.4 |

It will be observed that only n-butyl-isobutyl ether is present, the di-n-butyl ether remaining in the main fraction of the butyl ethers.

When this mixture is passed at 190° C. over the potassium alum catalyst used in Example 1 at the rate of 160 ml. per hour, a reaction product having the following composition is obtained:

| | Percent |
|---|---|
| Isobutanol | 2.5 |
| n-Butanol | 3.8 |
| n-Butyl-isobutyl ether | 75.4 |
| Di-n-butyl ether | 9.3 |
| Other products | 9.0 |

From this product the following mixture of butyl ethers is isolated by distillation:

| | Percent |
|---|---|
| n-Butyl-isobutyl ether | 88.4 |
| Di-n-butyl ether | 11.6 |
| Other products | 0.1 |

It was found that 62% of the butanols are converted into butyl ethers, which can be re-used, together with the fraction of butyl ethers likewise separated on the distillation of the hydrogenated product containing ethyl hexanol, as solvent for the initial oxo reaction, replacing the amount of ethers lost in the course of the total process.

The process of producing ethylhexanol according to the invention is advantageously carried out continuously.

The accompanying drawing illustrates diagrammatically an installation suitable for such continuous operation.

The hydroformylation is effected in the reactor 1, into which the propylene is introduced through the line 2 and the mixture of carbon monoxide and hydrogen through the line 3. The solvent constituted by a mixture of isomeric butyl ethers and containing dissolved cobalt-carbonyls arrives through the line 4. The reactional mixture and the gas then pass through the decobalter 5, into which an aqueous solution of sodium carbonate is injected through the line 6. After the reaction mixture has been cooled in the cooler 7, the residual gas is separated in the separator 8 and the liquid reaction products are allowed to settle in the decanter 9. The supernatant organic product is washed in counter-current with water arriving through the line 11 in the column 10. The washing water and the aqueous extract originating from the decanter 9 are introduced into the column 12, from which the dissolved organic products are recovered either by distillation or by extraction. The organic products coming from the columns 10 and 12 pass through the line 13 into the topping column 14 in order to eliminate the isobutanal. The residue coming from this column is treated in the aldolisation-crotonisation reactor 15 by an aqueous soda solution injected through the line 16. The product leaving the reactor 15 is passed to the decanter 17, in which there are separated an aqueous layer, which is returned to the reactor 15, and an organic layer which is passed to the catalytic hydrogenation reactor 18. After elimination of the hydrogen in the separator 19 the hydrogenated product is passed to the column 20 to eliminate at the top an azeotropic fraction constituted by all the butanols and part of the butyl ethers. This fraction is passed in the vapour state to the reactor 21 containing a dehydration catalyst. The product withdrawn at the bottom of the reactor 21 is recycled to the column 20. The residue from the distillation column 20 is passed to the columns 22 and 23, in which the butyl ethers and ethylhexanol are successively isolated at the top. The butyl ethers recovered are passed through the line 24 to the top of the hydroformylation catalyst regeneration column 25, into which the aqueous solution coming from the column 12 and sulphuric acid are introduced simultaneously through the line 26. The freed cobalt-tetracarbonyl hydride passes into the butyl ethers and, after separation of the aqueous solution in the decanter 27, the solvent charged with catalyst is returned to the hydroformylation reactor 1 through the line 4.

What we claim is:

1. A continuous method for the manufacture of ethylhexanol comprising hydroformylating propylene in the presence of a cobalt carbonyl catalyst and butyl ethers as solvent to obtain a reaction mixture containing n-butanals, iso-butanals, butanols, butyl formates, catalyst residues and said solvent, removing catalyst residues from said reaction mixture, further separating said isobutanols from said reaction mixture whereby a distillation residue is obtained mainly consisting of n-butanals, butyl formates and butyl ethers, heating said distillation residue with an aldolising-crotonising initiator to convert said n-butanal in said distillation mixture to ethyl-hexenal, whereby a further reaction mixture is obtained, an aqueous solution and an organic solution containing said ethyl-hexenal, separating said organic mixture from said aqueous solution, heating said organic mixture with hydrogen under pressure in the presence of a hydrogenation catalyst, whereby said ethyl-hexenal in said organic solution is converted to ethyl-hexanol, and a further organic solution is obtained, distilling said further organic solution to separate an azeotropic fraction consisting of butanols and butyl ethers from a mixture containing said ethyl-hexanol and a remaining quantity of butyl ethers, heating said azeotropic fraction in the presence of a dehydration catalyst, whereby said butanols in said fraction are converted to butyl ethers and a converted fraction is obtained, collecting the butyl ethers in said converted fraction and said remaining quantity of butyl ethers, and recycling said butyl ethers to the propylene hydroformylation step.

2. A process according to claim 1, wherein the by-product butyl formates of the hydroformylation reaction are saponified to sodium formate and butanols during the butanal aldoloisation-crotonisation reaction.

3. A process according to claim 1, wherein dehydration of the butanols is carried out in the presence of a catalyst obtained by thermal decomposition of potassium alum.

References Cited
UNITED STATES PATENTS

| | | | |
|---|---|---|---|
| 3,094,564 | 6/1963 | Mertzweiller et al. | 260—604 HF |
| 2,477,553 | 7/1949 | McKeever | 260—604 HF |
| 1,868,076 | 7/1932 | Ricard | 260—614 R |

FOREIGN PATENTS

| | | | |
|---|---|---|---|
| 1,496,422 | 8/1967 | France | 260—604 HF |
| 1,427,565 | 12/1965 | France | 260—604 HF |

LEON ZITVER, Primary Examiner

R. H. LILES, Assistant Examiner

U.S. Cl. X.R.

260—604 HF, 614 A, 488 F, 614 R